United States Patent [19]
Marlor

[11] Patent Number: 6,017,838
[45] Date of Patent: Jan. 25, 2000

[54] LEAD FREE SOFT GLASS HAVING HIGH ELECTRICAL RESISTIVITY

[75] Inventor: Richard C. Marlor, Beverly, Mass.

[73] Assignee: Osram Sylvania Inc., Danvers, Mass.

[21] Appl. No.: 09/150,915

[22] Filed: Sep. 10, 1998

[51] Int. Cl.[7] .................................................. C03L 3/087
[52] U.S. Cl. .............................. 501/70; 501/66; 501/905; 313/636
[58] Field of Search ................................ 501/66, 70, 905; 313/636

[56] References Cited

U.S. PATENT DOCUMENTS

| | | | |
|---|---|---|---|
| 2,877,124 | 3/1959 | Welsch | 501/70 |
| 3,252,812 | 5/1966 | de Lajarte | 501/70 |
| 4,089,694 | 5/1978 | Thomas et al. | 501/70 |
| 5,391,523 | 2/1995 | Marlor | 501/14 |
| 5,470,805 | 11/1995 | Filmer | 501/55 |
| 5,528,107 | 6/1996 | Marlor et al. | 501/70 |
| 5,557,171 | 9/1996 | Marlor et al. | 501/70 |
| 5,883,030 | 3/1999 | Bako et al. | 501/70 |
| 5,910,707 | 6/1999 | Bell | 501/70 |

FOREIGN PATENT DOCUMENTS

| | | | |
|---|---|---|---|
| 57-51150 | 3/1982 | Japan | C03C 3/10 |
| 58-60638 | 4/1983 | Japan | C03C 3/04 |

*Primary Examiner*—Karl Group
*Attorney, Agent, or Firm*—Robert F. Clark

[57] ABSTRACT

A universal lead free glass (ULF) has been developed having a high electrical resistivity and mechanical working properties comparable to conventional lead glasses used in the manufacture of electric lamps. The ULF glass may be used to manufacture both low and high wattage electric lamps and in particular to make filament mounts for such applications.

36 Claims, 3 Drawing Sheets

LEAD FREE SOFT GLASS HAVING HIGH ELECTRICAL RESISTIVITY

TECHNICAL FIELD

This invention relates to electric lamps and particularly to lamps made with glass envelopes or glass mounts. More particularly, this invention is concerned with an electric lamp made with a lead free glass composition.

BACKGROUND ART

Lead for centuries has played an important role in making glass the common, easily formed, low cost material that it is. Lead in glass lowers the softening and melting points of glass making the glass workable at lower temperatures. There is now an environmental effort to eliminate lead from products commonly discarded in landfills, including glass products such as electric lamps. Conceptually, the elimination of lead from glass is simple. One needs merely to remove lead from the existing formulations and melt and work the lead free formulation at a higher temperature. Unfortunately, this is not a practical solution. For example, lead glasses are commonly used to make electric lamps, where the lamp cost depends largely on the raw material cost, the speed at which glass can be formed (equipment utilization speed) and the energy cost of processing the glass. Simply removing lead from glass formulas would require re-equiping factories to operate with higher temperature glasses and result in higher fuel costs for the manufacturer.

Most glass tubing used to make electric lamps is made by the Vello tube drawing process. Lead glasses such as SG10 and SG12 usually work well on the Vello process because they typically melt at lower temperatures and melt more efficiently than lead free glasses due to the fluxing ability of lead oxide. The Vello process produces tubes with excellent dimensional quality at very high drawing speeds, but forms the glass tubing at relatively high viscosities. Hence, glass compositions used on the Vello process must have low liquidus temperatures. In particular, the Vello process has been found to work best when the glass being formed has a viscosity of about 50,000 poise. It is also desirable to have a 50° C. or more temperature difference between the liquidus temperature and the working temperature. Additionally, in order to manufacture the large variety of incandescent and fluorescent lamp products, glass tubing must be reworked on a variety of lamp working machines. This equipment must be versatile since there are thousands of lamp shapes which must be manufactured by the same process. Reworking the glass tubing to form flares, mounts, and blown bulbs requires a glass with a long working range, that is, one where there is a large temperature difference between the softening temperature and the working temperature of the glass.

Most known lead free glasses would be impractical to use in existing lamp making equipment since their melting and softening points are too high. In order to accommodate these more viscous materials, glass forming machinery would need to be modified and pressing, bending, and blowing operations would need re-adjustment. As a result, simple elimination of lead would drive up the manufacturing cost of electric lamps substantially. For example, most lead free and low lead glass compositions have short working ranges. Glasses with short working ranges tend to result in products with poor dimensional control and many glass defects. As such, a short working range requires very close temperature control at every production (index) station in the lamp manufacturing process. The labor and equipment required to monitor the lamp manufacturing process properly would raise manufacturing costs. For these reasons, there is a need for a lead free glass that has nearly the same mechanical working characteristics as the lead glass already in use.

In addition to the mechanical working properties of the glass, the glass must satisfy other criteria in order to produce high quality electric lamps. In particular, high electrical resistivity is required in the lamp glass which is used to make wire seals. The high resistivity prevents alkali migration during lamp operation. Alkali migration, also commonly referred to as electrolysis, can result in the glass cracking and lamp failure. High wattage incandescent lamps are the most prone to electrolysis since they typically operate at high temperatures and voltages. Although lamps might be redesigned to prevent electrolysis failures, the cost required to redesign all high wattage lamps and to make the necessary machine changes to manufacture the new lamps would be cost prohibitive. In addition, the glass must seal with the leads that penetrate the envelope to provide electric power to the light source. Large differences in thermal expansion can cause the glass to crack and break the hermetic lamp seal. Air then penetrates the envelope and oxidizes the filament. Consequently, there is a need for a lead free glass having a high electrical resistivity and a thermal expansion matched to that of the electric lamp leads.

Lastly, lamp manufacturers typically produce both low and high wattage incandescent lamps. As discussed above, high wattage lamps require a glass having a superior high temperature electrical resistivity. In the case of lead glass, SG12 is typically used. However, the high lead and potassia content of SG12 make this a more expensive glass type which restricts its use only to applications requiring the higher resistivity. As a result, manufacturers must use more than one type of lead glass to manufacture both low and high wattage lamp types, e.g., SG10 and SG12. This leads to increased inventory costs because of the need for more than one glass type and added manufacturing costs because of the need to adjust the sealing process for each glass. Thus, it would be advantage to have a lead free glass which could be used equally in the manufacture of low and high wattage electric lamps.

Examples of the prior art are shown in the following references.

U.S. Pat. No. 2,877,124 to Welsh, teaches lead free glasses that do not have the high electrical resistivities required for lamps.

U.S. Pat. No. 4,089,694 to Thomas et al. describes lamp glasses containing small amounts of baria and lithia as a replacement for lead in glass. The $K_2O$ to $Na_2O$ molar ratios are quite low, so the electrical resistivities are insufficient for most incandescent lighting applications. Fluorine was also required to improve glass melting and workability. Fluorine is undesirable since it is volatile and hazardous during glass melting.

U.S. Pat. No. 3,252,812, to DeLajarte, teaches lead free glasses that do no include lithia. The liquidus temperature of the DeLajarte glasses range from 1070° C. to 1146° C. which are too high, and the glass too soft for the Vello tube drawing process. The DeLajarte compositions would therefore devitrify prior to being Vello formed into tubing.

Kokai Pat. No. Sho 58 [1983]-60638 to Kawaguchi et al concerns lead free glasses suitable for manufacture of fluorescent lamp bulbs. They claim that their glass with BaO above 3.0 weight percent results in devitrification of the composition. The high electrical resistivities required for many incandescent lamps forces the BaO concentrations above this level.

Kokai Pat. No. Sho 57 [1982]-51150, to Sakamoto and Hayami also teaches lead free glasses for fluorescent lamp bulbs. With their compositions, BaO below 10.1 weight percent resulted in a more constricted, poorer working glass.

U.S. Pat. No. 5,391,523 to Marlor, which is incorporated herein by reference, discloses a lead free glass, SG64, which is an acceptable replacement for conventional lead glasses in most lamp types. However, the resistivity of the SG64 glass is insufficient for the mounts in high wattage incandescent lamps. Thus, it is still necessary for lamp manufacturers to use a high resistivity leaded glass, e.g., SG12, for such applications.

U.S. Pat. No. 5,470,805, to Filmer, describes lead free glasses, in particular one which is a commercially available lead free glass, PH360. Although the glasses cited can be used successfully to manufacture a wide variety of incandescent and fluorescent lamps, the electrical resistivity is too low for many higher wattage incandescent lamp types.

SUMMARY OF THE INVENTION

It is an object of the invention to obviate the disadvantages of the prior art.

It is another object of the invention to provide a lead free glass which can be used to manufacture both low wattage and high wattage electric lamps.

It is a further object of the invention to provide a lead free glass which has mechanical working properties comparable to conventional leaded glasses.

In accordance with one object of the invention, there is provided a universal lead free glass having a composition, in weight percent, of:

| | | | |
|---|---|---|---|
| $SiO_2$ | 58 | to | 69 |
| $Na_2O$ | 3.2 | to | 5.5 |
| $K_2O$ | 8.5 | to | 12 |
| $Li_2O$ | 0.5 | to | 2.5 |
| BaO | 6 | to | 12 |
| SrO | 0 | to | 4 |
| CaO | 1 | to | 6 |
| MgO | 0 | to | 3 |
| $Al_2O_3$ | 2.1 | to | 7.0 |
| $B_2O_3$ | 0 | to | 3 | and wherein the mole ratio of $K_2O$ to $Na_2O$ is at least 1.1.

In accordance with another object of the invention, there is provided an electric lamp having a glass bulb and at least one mount, each mount having a glass body and at least one filament electrically coupled to a pair of leads, the leads having middle regions and exterior ends, the middle regions of the leads extending through and sealing with the glass body, the glass body being disposed between the filament and the exterior ends of the leads and being formed of a universal lead free glass, and the glass bulb and the glass body being sealed to form an enclosed volume containing the filament.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

A universal lead free (ULF) has been discovered which can be used to replace lead glass in both low and high wattage electric lamp applications. The ULF glass may be used without wholesale changes in lamp manufacturing processes or lamp designs. The ULF glass possesses mechanical working properties comparable to conventional lead glasses while providing high electrical resistivity and desirable wire sealing attributes.

Figure 1:
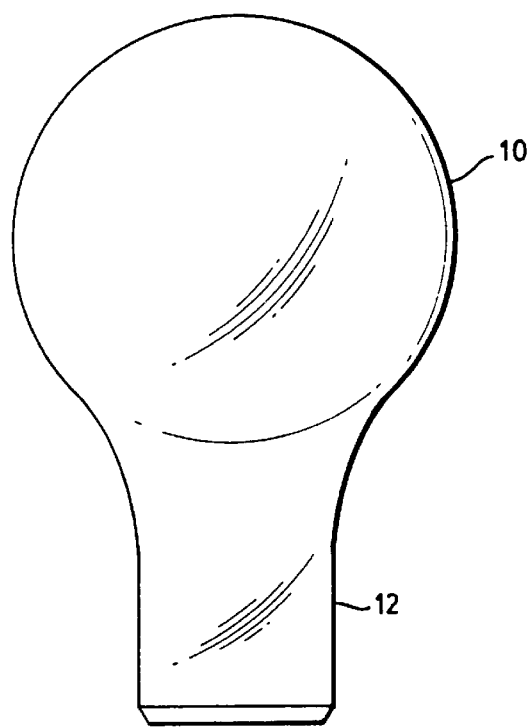
FIG. 1 shows a blown glass bulb used in making an incandescent lamp.
Figure 3:
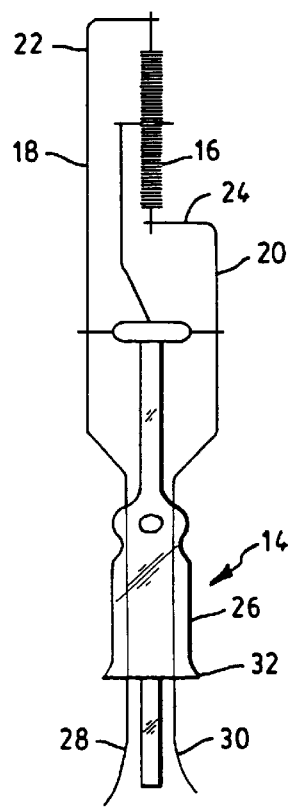
FIG. 3 shows a filament mount used in making an incandescent lamp.
Figure 2:
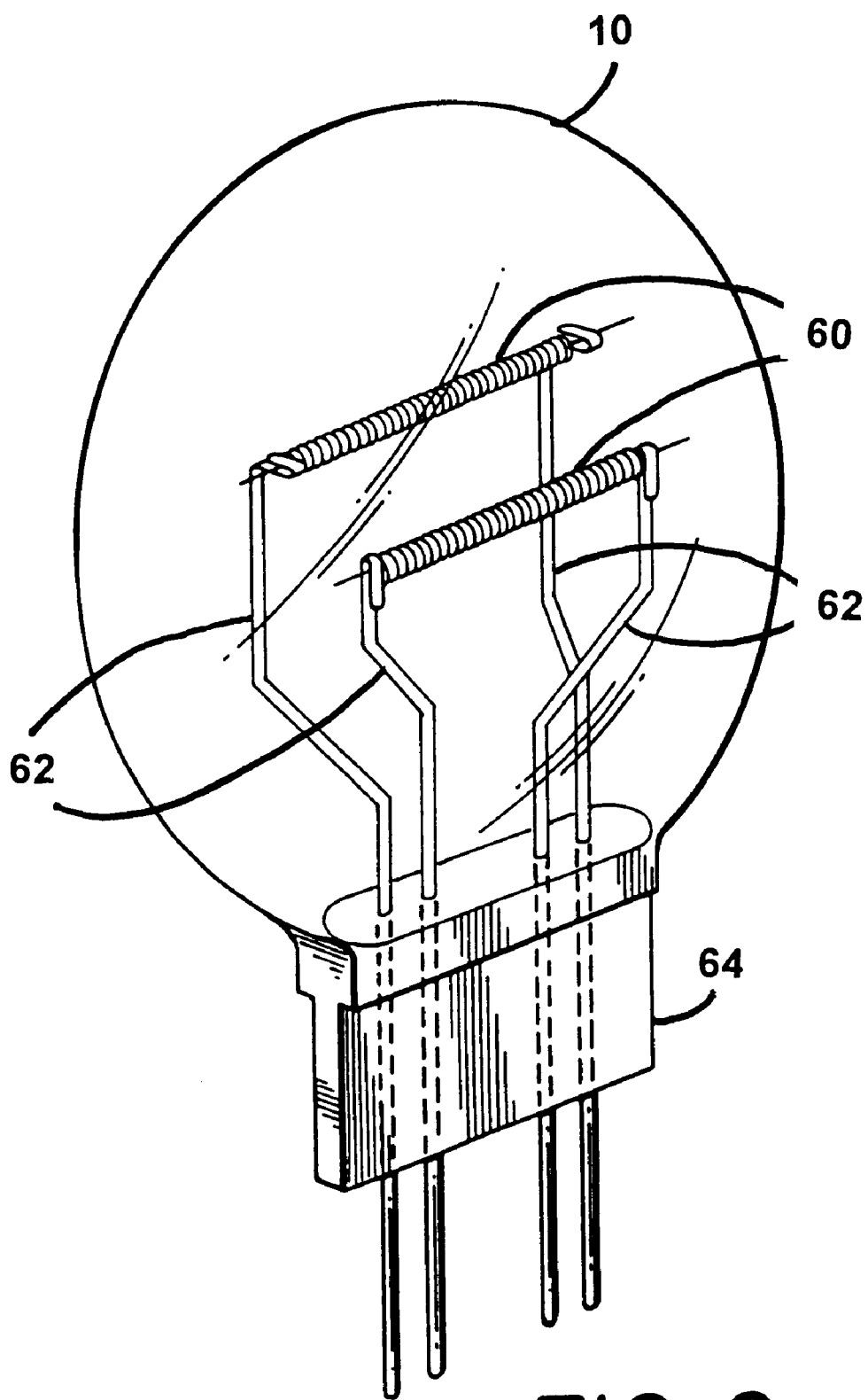
FIG. 2 shows an incandescent lamp capsule having a glass bulb.

FIG. 1 shows a blown glass bulb made used in making an incandescent lamp. The bulb 10 consists of a glass body substantially enclosing an interior volume. A necked region 12 defining an open passage connects the interior of the bulb to the exterior. Where the bulb 10 is sealed directly to the lead wires, as in press sealed miniature lamps, it is reasonable to use the univeral lead free glass of this invention to take advantage of the electrical resistivity, and the thermal expansion characteristics of the ULF glass formulation. For example, FIG. 2 shows an incandescent lamp capsule having a glass bulb. The glass bulb 10 encloses two filaments 60 that are each supported by two leads 62. The four support leads 62 each extend through a press seal 64 to the exterior of the lamp capsule. Using ULF glass to make the bulb results in the bulb and leads having thermally matched expansions which assures a good seal between the bulb and leads. Miniature lamps are commonly made in this fashion.

Where the bulb 10 is sealed to a mount structure, the bulb would normally be made of a lime glass and only the mount, as shown in FIG. 3, would be made of the ULF glass. FIG. 3 shows a filament mount 14 used in making an incandescent lamp. The filament mount 14 comprises a filament 16 electrically coupled to two leads 18, 20 at interior ends 22, 24 of the leads 18, 20. The filament 14 may be additionally held by one or more of the numerous filament support structures known in the art. The leads 18, 20 have middle regions extending through, and sealing with a glass body 26, and exterior ends 28, 30 extending beyond the glass body 26 for connection to an Edison or other type lamp base. The electric leads 18, 24 may be made out of electrically conductive wire, commonly nickel coated copper or other lead wire materials, such as dumet, nickel, niron (Fe—Ni alloy), and Sylvania #4 alloy, as commonly used in the lighting industry. The lead wires may have the general form of straight leads extending from connection points with the light source in the interior of the envelope through the envelope to the exterior of the envelope to exterior contacts. Given the similarity of thermal expansions between existing lamp glasses and the new ULF glass formulation, differing lamp components of old and new formulations may be easily combined in one structure. Integration of the new glass formulation into manufacturing processes may proceed with little manufacturing disruption.

Figure 4:
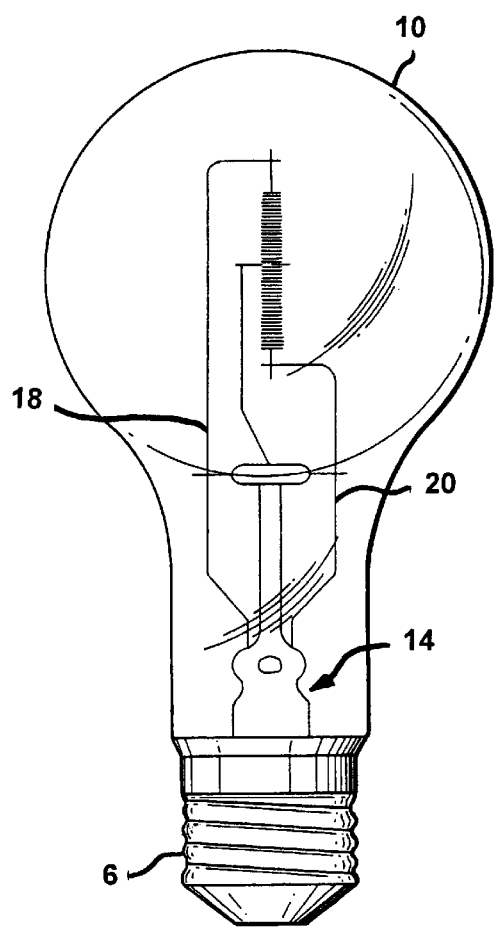
FIG. 4 shows an incandescent lamp including the filament mount.

The glass body 26 may include a disk or flared rim 32 that may be fitted and then sealed to the necked region 12 of the open passage of blown bulb 10 with the filament 16 enclosed in the interior of the blown bulb 10, and the exterior ends 28, 30 of the leads extending outwards. FIG. 4 shows an incandescent lamp formed from blown bulb 10 and incandescent filament mount 14. The blown lime glass bulb 10 and ULF glass mount 14 have been sealed together, and a threaded base 6 has been attached and electrically coupled to the leads 18, 20.

Figure 5:
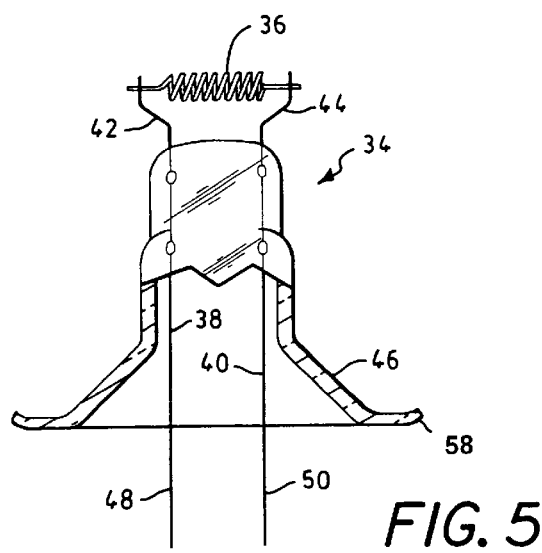
FIG. 5 shows a filament mount used in making a fluorescent lamp.
Figure 6:
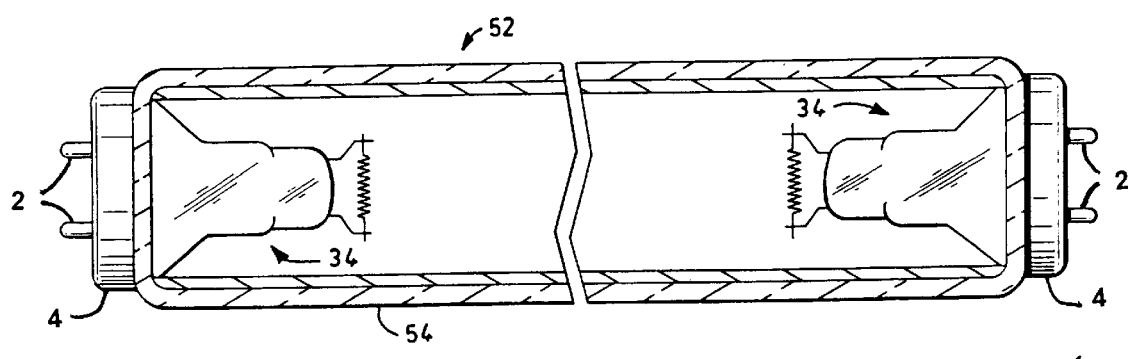
FIG. 6 shows a fluorescent lamp partially broken away.

FIG. 5 shows a filament mount 34 used in making a fluorescent lamp. The filament mount 34 comprises a filament 36 electrically coupled to two leads 38, 40 at interior ends 42, 44. The leads 38, 40 have middle regions extending through, and sealing with a ULF glass body 46. The exterior ends 48, 50 of the leads 38, 40 extend for connection to an single pin, double pin, threaded or other fluorescent lamp base. The ULF glass body 46 may include a disk or flared rim 58 that may be fitted and then sealed to the open passage of a fluorescent lamp tube. FIG. 6 shows a fluorescent lamp 52 formed from a phosphor coated cylindrical tube 54 and two fluorescent lamp mounts 34. The mounts 34 and tube 54 have been sealed together, and a two pin base has been attached, and electrically coupled to the leads 38, 40. The exterior contacts in the base may be made out of conductive metal, such as brass, to have the familiar electrical contacts common to lamps, such as a threaded Edison base or a two pin fluorescent lamp. The light source electrically is then coupled through the leads to the contacts, with the glass mount or envelope sealing to the leads.

The blown bulb, incandescent mount, fluorescent mount, fluorescent tube, or most any other glass lamp component may be made out of the universal lead free glass. Since the ULF glass may be more expensive to make than, for example, regular lime glass, it may be economical to make only the glass component that includes the lead wire portion out of the ULF glass. The ULF glass component may then be combined with lime glass components as needed. For example, a ULF glass may be formed into a mount, and sealed to a regular lime glass bulb, so the light source is enclosed in a glass envelope. It is of course possible to make the whole lamp from the ULF glass.

The universal lead free (ULF) glass of this invention has a composition, in weight percent, of:

| | | | |
|---|---|---|---|
| $SiO_2$ | 58 | to | 69 |
| $Na_2O$ | 3.2 | to | 5.5 |
| $K_2O$ | 8.5 | to | 12 |
| $Li_2O$ | 0.5 | to | 2.5 |
| BaO | 6 | to | 12 |
| SrO | 0 | to | 4 |
| CaO | 1 | to | 6 |
| MgO | 0 | to | 3 |
| $Al_2O_3$ | 2.1 | to | 7.0 |
| $B_2O_3$ | 0 | to | 3 |

In order to provide the necessary resistivity for high wattage lamps, the mole ratio of $K_2O$ to $Na_2O$ must be at least 1.1. Since $K_2O$ is far more expensive than $Na_2O$, the amount of $K_2O$ is preferably limited to that needed to meet electrical requirements. $K_2O$ also increases viscosity of the glass which must be controlled. Preferably, the mole ratio of $K_2O$ to $Na_2O$ is 1.1 to 1.4.

The log resistivity of the glass at 250° C. is preferably at least 9.2 ohm-cm and, more preferably, at least 9.5 ohm-cm. The amount of $Li_2O$ may also affect the electrical resistivity. However, since $Li_2O$ is also a very expensive alkali, the amount of $Li_2O$ is preferably limited to the amount required to soften the glass.

MgO is known as a partial substitute for CaO, but this substitution detrimentally affects the electrical resistivity. This affect can to a degree be offset by adjusting the BaO component. Dolomite $(CaMg(CO_3)_2)$ is an inexpensive combined source of Ca and Mg that may be used and offset for by adjusting the BaO.

Fining agents are generally added to the glass melt to assist in bubble release. Commonly used fining agents, such as $Sb_2O_3$, $CeO_2$, and sulfates (e.g., $Na_2SO_4$, $BaSO_4$, $CaSO_4$) can be used to fine ULF glasses. $CeO_2$, $Sb_2O_3$, and/or $Fe_2O_3$ can be added to ULF glasses to improve ultraviolet absorption which is important for fluorescent lamp applications. The fining agents and ultraviolet absorbers are preferably added in amounts less than about 1 weight percent.

A preferred ULF glass composition, in weight percent, for use in the Vello drawing process is:

| | | | |
|---|---|---|---|
| $SiO_2$ | 63.2 | to | 66.3 |
| $Na_2O$ | 4.8 | to | 5.3 |
| $K_2O$ | 9.3 | to | 10.1 |
| $Li_2O$ | 1.3 | to | 1.4 |
| BaO | 6 | to | 8.8 |
| SrO | 0 | to | 2.0 |
| CaO | 2.7 | to | 3.2 |
| MgO | 0 | to | 2.2 |
| $Al_2O_3$ | 4.7 | to | 5.3 |
| $B_2O_3$ | 1.3 | to | 1.8 |

The compositions of two ULF glass batches, ULF14 and ULF15, capable of use in the Vello process are compared in Table 1 with prior art lead glasses SG10 and SG12 and lead free glasses SG64 and PH360. The electrical resistivities of the glasses are compared in Table 2.

TABLE 1

Glass Compositions

| Oxide | SG10 | SG12 | SG64 | PH360 | ULF14 | ULF15 |
|---|---|---|---|---|---|---|
| $SiO_2$ | 61.7 | 55.7 | 66.1 | 67.8 | 66.1 | 64.7 |
| $Na_2O$ | 6.9 | 4 | 7.4 | 7.5 | 5.3 | 4.8 |
| $K_2O$ | 7.5 | 8.7 | 7.0 | 5.0 | 9.3 | 10.1 |
| $Li_2O$ | — | — | 1.3 | 1.2 | 1.3 | 1.3 |
| BaO | — | — | 8.1 | 8.9 | 8.8 | 8.0 |
| SrO or [PbO] | [21.4] | [29.4] | — | 3.0 | — | — |
| CaO | — | — | 2.66 | 1.9 | 2.7 | 3.0 |
| MgO | — | — | — | 1.3 | — | 2.1 |
| $Al_2O_3$ | 2.2 | 1.9 | 4.7 | 3.4 | 4.7 | 4.7 |
| $B_2O_3$ | — | — | 2.4 | — | 1.8 | 1.3 |
| $Sb_2O_3$ | 0.15 | 0.19 | 0.34 | — | — | — |
| $K_2O/Na_2O$ Mole ratio | 0.72 | 1.43 | 0.62 | 0.44 | 1.16 | 1.39 |

TABLE 2

Log Resistivity [ohm-cm]

| Glass Temperature | SG10 | SG64 | PH360 | SG12 | ULF14 | ULF15 |
|---|---|---|---|---|---|---|
| 250° C. | 8.5 | 8.8 | 8.6 | 9.6 | 9.3 | 9.6 |
| 350° C. | 6.7 | 7.0 | 6.9 | 7.7 | 7.4 | 7.7 |

The electrical resistivity of the ULF14 glass at 250° C. is at least six times greater than SG10 and at least three times greater than SG64. The resisitivity of the ULF15 glass at 250° C. is more than twelve times that of SG10 and at least six times greater than SG64. More significantly, the resistivity of ULF15 is exactly the same as SG12. As described above, this is an important property for the glass used in the mounts of high wattage incandescent lamps. It is also important that the ULF glass possess similar thermal characteristics as well as glass melting and working properties. These properties are compared in Tables 3–5.

Thermal expansion was measured with a dilatometer from room temperature to 300° C. The thermal expansion of sealing glasses must be controlled to prevent glass fracture at any time throughout the life of a lamp. Seal stress and strain between the glasses and a SG80 soda lime reference glass was measured using the trident seal test. Soda lime glass was chosen as the reference glass since ULF sealing glasses would typically be sealed in production to a soda lime glass bulb or tube. The sign for all mismatch strains in Table 3 is compressive [C]. This means that the thermal contraction of the soda lime glass is less than the ULF glasses by exactly the mismatch strain measured. The thermal contractions are measured from the glass setting point to room temperature. Good seals can be made with mismatch strains less than 500 ppm.

TABLE 3

Thermal Expansion/Sealing

|  | SG10 | SG12 | SG64 | PH360 | ULF14 | ULF15 |
|---|---|---|---|---|---|---|
| Thermal Expansion 23–300° C. [×10⁻⁷/° C.] | 92.0 | 90.0 | 91.7 | 90.3 | 90.7 | 91.4 |
| Trident Seal, SG80 [ppm] | 159C | 52C | 230C | 129C | 98C | 140C |

TABLE 4

Viscosity

| Viscosity [Poise] | SG10 | SG12 | SG64 | PH360 | ULF14 | ULF15 |
|---|---|---|---|---|---|---|
|  |  |  | Temperature (° C.) |  |  |  |
| 100 | 1509 |  | 1437 | 1483 | 1496 | 1489 |
| 1,000 | 1200 |  | 1152 | 1201 | 1201 | 1208 |
| 10,000 | 1001 | 985 | 978 | 1015 | 1016 | 1026 |
| 50,000 (Vello) | 898 |  | 889 | 918 | 922 | 932 |
| 100,000 | 861 |  | 855 | 883 | 888 | 898 |

TABLE 5

Working Parameters

|  | SG10 | SG12 | SG64 | PH360 | ULF14 | ULF15 |
|---|---|---|---|---|---|---|
| Softening Point (° C.) | 634 | 630 | 667 | 676 | 685 | 691 |
| Working Range (° C.) | 367 | 355 | 311 | 338 | 331 | 335 |
| Annealing Point (° C.) | 435 | 435 | 487 | 487 | 504 | 506 |

The average thermal expansion for the ULF compositions in Table 3 is about $91 \times 10^{-7}/°$ C. over the range from 23° C. to 300° C. which compares favorable with the other glasses. The trident seal data shows that mismatch strain for both ULF compositions is less than the SG10 lead glass. The temperature of the ULF glass at 1000 poise is essentially the same as SG10 and PH360 glasses, about 1200° C. Viscosities within the range of 100 to 1000 poise are important for melting and fining the glass. The glass working range for the ULF14 and ULF15 glasses of at least about 330° C. allows for fast Vello drawing speeds, and fewer indexes between glass forming and glass annealing on the high speed production lamp sealing equipment. The above data demonstrate that the ULF glass is interchangeable with SG10 and SG12 lead glasses in all conventional lamp manufacturing applications including high wattage incandescent mounts. One preferred composition, ULF14, has the same working properties as the commercially available PH360 glass, and as such ULF14 could be substituted without fire changes for PH360 glass. This universal lead free glass can also be used for both low and high wattage lamps. The electrical resistivity of ULF14 is five times that of PH360 at 250° C. and three times at 350° C. Thus, a universal lead free glass composition can now be made that seals to existing sealing glasses, and wires, while maintaining viscosity characteristics similar to those of the lead glass used for high speed lamp sealing. The universal lead free glass is expected to work as well during glass sealing, and produce the same quality seal, at efficiencies similar to lead glasses SG10 and SG12.

Another preferred composition, in weight percent, for use in the Danner tube drawing process is:

| $SiO_2$ | 58 | to | 66.4 |
|---|---|---|---|
| $Na_2O$ | 3.3 | to | 5.5 |
| $K_2O$ | 9 | to | 9.3 |
| $Li_2O$ | 1.4 | to | 2.5 |
| BaO | 8 | to | 14.3 |
| CaO | 0 | to | 5.2 |
| MgO | 0 | to | 3 |
| $Al_2O_3$ | 4.5 | to | 4.7 |
| $B_2O_3$ | 0 | to | 4 |
| $Sb_2O_3$ | 0 | to | 0.2 |
| ZnO | 0 | to | 3.2 |

The Danner tube drawing process forms tubing over a rotating refractory tube. Viscosities are considerably lower than the Vello process, such that ULF glasses having higher liquidus temperatures can be efficiently drawn.

While there has been shown and described what are at the present considered the preferred embodiments of the invention, it will be obvious to those skilled in the art that various changes and modifications may be made therein without departing from the scope of the invention as defined by the appended claims.

I claim:

1. A universal lead free glass having a composition, in weight percent, of:

| $SiO_2$ | 58 to 69 |
|---|---|
| $Na_2O$ | 3.2 to 5.5 |
| $K_2O$ | 8.5 to 12 |
| $Li_2O$ | 0.5 to 2.5 |
| BaO | 6 to 12 |
| SrO | 0 to 4 |
| CaO | 1 to 6 |
| MgO | 0 to 3 |
| $Al_2O_3$ | 2.1 to 7.0 |
| $B_2O_3$ | 0 to 3 | and wherein the mole ratio of $K_2O$ to $Na_2O$ is at least 1.1.

2. The glass of claim 1 wherein the mole ratio of $K_2O$ to $Na_2O$ is from 1.1 to 1.4.

3. The glass of claim 1 further comprising a fining agent or an ultraviolet absorber in an amount less than about 1.0 weight percent.

4. The glass of claim 3 wherein the fining agent is selected from the group consisting of $Sb_2O_3$, $CeO_2$, $Na_2SO_4$, $BaSO_4$ or $CaSO_4$ and the ultraviolet absorber is selected from the group consisting of $CeO_2$, $Sb_2O_3$ or $Fe_2O_3$.

5. The glass of claim 1 wherein the glass has a log resistivity at 250° C. of at least 9.2 ohm-cm.

6. The glass of claim 5 wherein the log resistivity at 250° C. is at least 9.5 ohm-cm.

7. The glass of claim 1 wherein the glass has a thermal expansion of about $91\times10^{-7}/°$ C. in the temperature range from 23° C. to 300° C.

8. The glass of claim 1 wherein the glass has a viscosity of 1000 poise at a temperature of about 1200° C.

9. The glass of claim 1 wherein the glass has a working range of at least about 330° C.

10. The glass of claim 1 wherein the glass has a log resistivity at 250° C. of at least 9.2 ohm-cm and a thermal expansion of about $91\times10^{7}/°$ C. in the temperature range from 23° C. to 300° C.

11. The glass of claim 10 wherein the glass has a viscosity of 1000 poise at a temperature of about 1200° C. and a working range of at least about 330° C.

12. A universal lead free glass having a composition, in weight percent, of:

| | | | |
|---|---|---|---|
| $SiO_2$ | 63.2 | to | 66.3 |
| $Na_2O$ | 4.8 | to | 5.3 |
| $K_2O$ | 9.3 | to | 10.1 |
| $Li_2O$ | 1.3 | to | 1.4 |
| BaO | 6 | to | 8.8 |
| SrO | 0 | to | 2.0 |
| CaO | 2.7 | to | 3.2 |
| MgO | 0 | to | 2.2 |
| $Al_2O_3$ | 4.7 | to | 5.3 |
| $B_2O_3$ | 1.3 | to | 1.8 | and wherein the mole ratio of $K_2O$ to $Na_2O$ is at least 1.1.

13. The glass of claim 12 wherein the mole ratio Of $K_2O$ to $Na_2O$ is from 1.1 to 1.4.

14. The glass of claim 12 further comprising a fining agent or an ultraviolet absorber in an amount less than about 1.0 weight percent.

15. The glass of claim 14 wherein the fining agent is selected from the group consisting of $Sb_2O_3$, $CeO_2$, $Na_2SO_4$, $BaSO_4$ or $CaSO_4$ and the ultraviolet absorber is selected from the group consisting of $CeO_2$, $Sb_2O_3$ or $Fe_2O_3$.

16. The glass of claim 12 wherein the glass has a log resistivity at 250° C. of at least 9.2 ohm-cm.

17. The glass of claim 16 wherein the log resistivity at 250° C. is at least 9.5 ohm-cm.

18. The glass of claim 12 where in the glass has a thermal expansion of about $91\times10^{-7}/°$ C. in the temperature range from 23° C. to 300° C.

19. The glass of claim 12 wherein the glass has a viscosity of 1000 poise at a temperature of about 1200° C.

20. The glass of claim 12 wherein the glass has a working range of at least about 330° C.

21. The glass of claim 12 wherein the glass has a log resistivity at 250° C. of at least 9.2 ohm-cm and a thermal expansion of about $91\times10^{-7}/°$ C. in the temperature range from 23° C. to 300° C.

22. The glass of claim 21 wherein the glass has a viscosity of 1000 poise at a temperature of about 1200° C. and a working range of at least about 330° C.

23. A universal lead free glass having a composition, in weight percent, of:

| | | | |
|---|---|---|---|
| $SiO_2$ | 58 | to | 66.4 |
| $Na_2O$ | 3.3 | to | 5.5 |
| $K_2O$ | 9 | to | 9.3 |
| $Li_2O$ | 1.4 | to | 2.5 |
| BaO | 8 | to | 14.3 |
| CaO | 0 | to | 5.2 |
| MgO | 0 | to | 3 |
| $Al_2O_3$ | 4.5 | to | 4.7 |
| $B_2O_3$ | 0 | to | 4 |
| $Sb_2O_3$ | 0 | to | 0.2 |
| ZnO | 0 | to | 3.2 | and wherein the mole ratio of $K_2O$ to $Na_2O$ is at least 1.1.

24. An electric lamp comprising:

a glass bulb and at least one mount;

each mount having a glass body and at least one filament electrically coupled to a pair of leads, the leads having middle regions and exterior ends, the middle regions of the leads extending through and sealing with the glass body, the glass body being disposed between the filament and the exterior ends of the leads and being formed of a universal lead free glass having a composition, in weight percent, of:

| | | | |
|---|---|---|---|
| $SiO_2$ | 58 | to | 69 |
| $Na_2O$ | 3.2 | to | 5.5 |
| $K_2O$ | 8.5 | to | 12 |
| $Li_2O$ | 0.5 | to | 2.5 |
| BaO | 6 | to | 12 |
| SrO | 0 | to | 4 |
| CaO | 1 | to | 6 |
| MgO | 0 | to | 3 |
| $Al_2O_3$ | 2.1 | to | 7.0 |
| $B_2O_3$ | 0 | to | 3 | wherein the mole ratio of $K_2O$ to $Na_2O$ is at least 1.1; and the glass bulb and the glass body being sealed to form an enclosed volume containing the filament.

25. The electric lamp of claim 24 wherein the mole ratio of $K_2O$ to $Na_2O$ is from 1.1 to 1.4.

26. The electric of claim 24 wherein the universal lead free glass has a log resistivity at 250° C. of at least 9.2 ohm-cm and a thermal expansion of about $91\times10^{-7}/°$ C. in the temperature range from 23° C. to 300° C.

27. The electric lamp of claim 24 wherein the universal lead free glass has a composition, in weight percent, of:

| | | | |
|---|---|---|---|
| $SiO_2$ | 63.2 | to | 66.3 |
| $Na_2O$ | 4.8 | to | 5.3 |
| $K_2O$ | 9.3 | to | 10.1 |
| $Li_2O$ | 1.3 | to | 1.4 |
| BaO | 6 | to | 8.8 |
| SrO | 0 | to | 2.0 |
| CaO | 2.7 | to | 3.2 |
| MgO | 0 | to | 2.2 |
| $Al_2O_3$ | 4.7 | to | 5.3 |
| $B_2O_3$ | 1.3 | to | 1.8 |

28. The electric lamp of claim 27 wherein the mole ratio of $K_2O$ to $Na_2O$ is from 1.1 to 1.4.

29. The electric lamp of claim 24 wherein the lamp has two mounts and the glass bulb is a tubular body having two ends, each mount being sealed to one end of the tube to form the enclosed volume containing the filaments.

30. The electric lamp of claim 24 wherein the glass bulb has the same composition as the glass body.

31. The electric lamp of claim 29 wherein the glass bulb has the same composition as the glass body.

32. An electric lamp comprising:

a glass bulb having a wall and containing an enclosed volume, the enclosed volume containing at least one filament electrically coupled to a pair of leads, the leads extending through and sealing with the wall, the bulb being formed of a universal lead free glass having a composition, in weight percent, of:

| | | | |
|---|---|---|---|
| $SiO_2$ | 58 | to | 69 |
| $Na_2O$ | 3.2 | to | 5.5 |
| $K_2O$ | 8.5 | to | 12 |
| $Li_2O$ | 0.5 | to | 2.5 |
| BaO | 6 | to | 12 |
| SrO | 0 | to | 4 |
| CaO | 1 | to | 6 |
| MgO | 0 | to | 3 |
| $Al_2O_3$ | 2.1 | to | 7.0 |
| $B_2O_3$ | 0 | to | 3 | wherein the mole ratio of $K_2O$ to $Na_2O$ is at least 1.1.

33. The electric lamp of claim 32 wherein the mole ratio of $K_2O$ to $Na_2O$ is from 1.1 to 1.4.

34. The electric of claim 32 wherein the universal lead free glass has a log resistivity at 250° C. of at least 9.2 ohm-cm and a thermal expansion of about $91\times10^7$/° C. in the temperature range from 23° C. to 300° C.

35. The electric lamp of claim 32 wherein the universal lead free glass has a composition, in weight percent, of:

| | | | |
|---|---|---|---|
| $SiO_2$ | 63.2 | to | 66.3 |
| $Na_2O$ | 4.8 | to | 5.3 |
| $K_2O$ | 9.3 | to | 10.1 |
| $Li_2O$ | 1.3 | to | 1.4 |
| BaO | 6 | to | 8.8 |
| SrO | 0 | to | 2.0 |
| CaO | 2.7 | to | 3.2 |
| MgO | 0 | to | 2.2 |
| $Al_2O_3$ | 4.7 | to | 5.3 |
| $B_2O_3$ | 1.3 | to | 1.8 |

36. The electric lamp of claim 35 wherein the mole ratio of $K_2O$ to $Na_2O$ is from 1.1 to 1.4.

* * * * *